Figure 1:
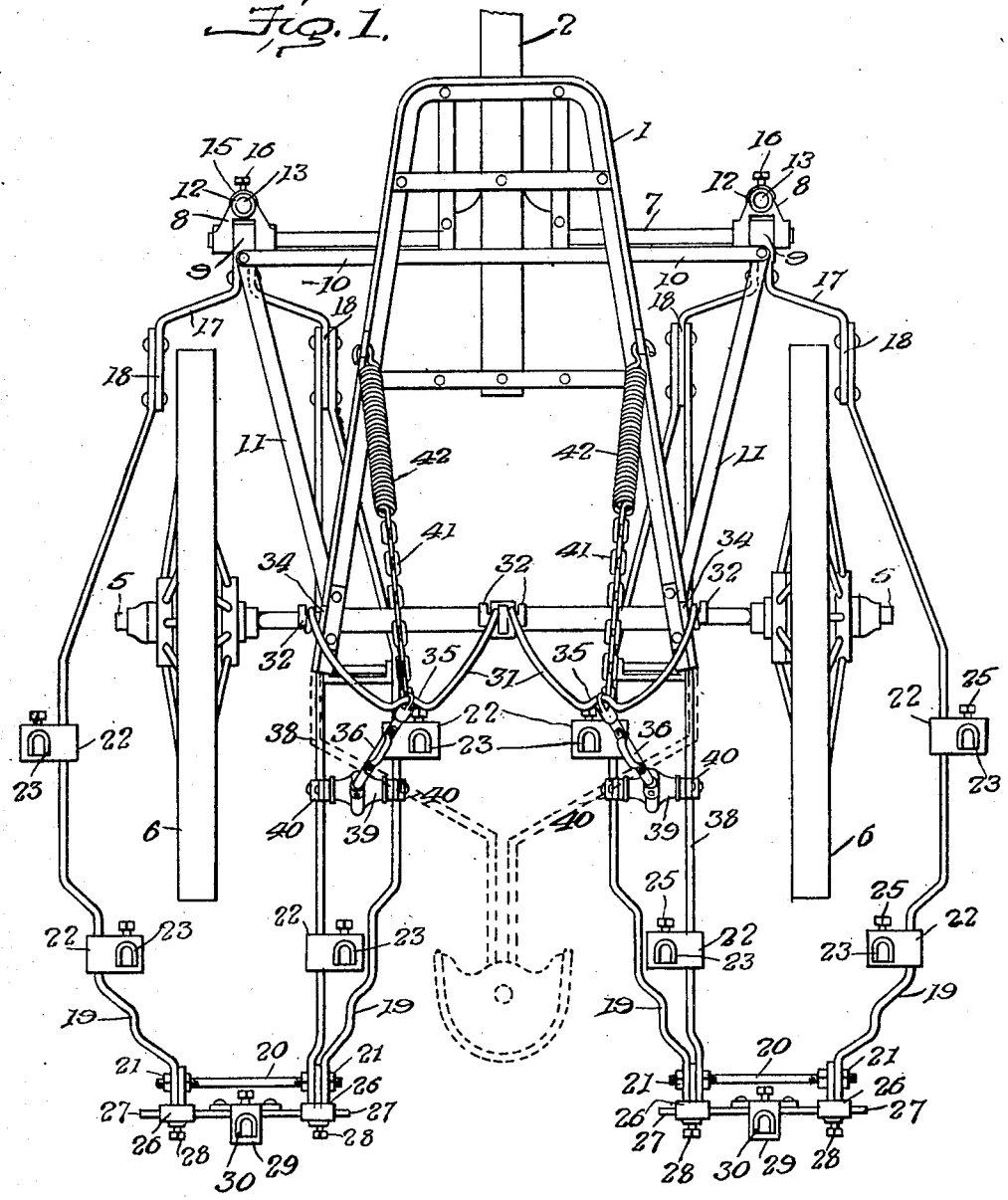

No. 872,450. PATENTED DEC. 3, 1907.
G. A. PLANK.
CULTIVATOR.
APPLICATION FILED FEB. 14, 1907.

2 SHEETS—SHEET 1.

Witnesses
G. Howard Walmsley
Edward X. Reed

Inventor
George A. Plank.

By H. A. Toulmin,
Attorney

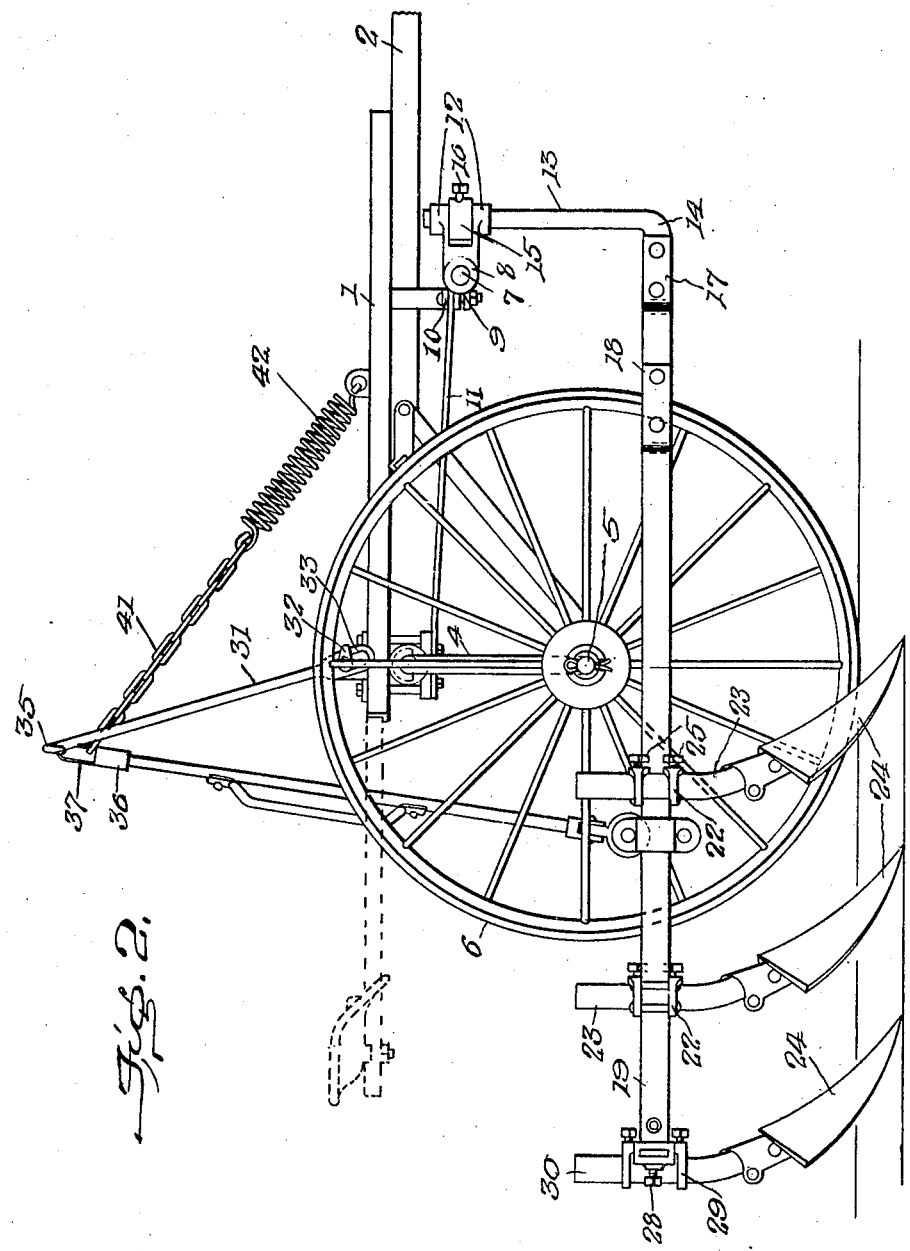

UNITED STATES PATENT OFFICE.

GEORGE A. PLANK, OF INDEPENDENCE, MISSOURI, ASSIGNOR TO THE OHIO CULTIVATOR COMPANY, OF BELLEVUE, OHIO, A CORPORATION OF OHIO.

CULTIVATOR.

No. 872,450.

Specification of Letters Patent.

Patented Dec. 3, 1907.

Application filed February 14, 1907. Serial No. 357,254.

*To all whom it may concern:*

Be it known that I, GEORGE A. PLANK, a citizen of the United States, residing at Independence, in the county of Jackson and State of Missouri, have invented certain new and useful Improvements in Cultivators, of which the following is a specification, reference being had therein to the accompanying drawings.

This invention relates to sulky cultivators, preferably of the riding type, and the object of the invention is to provide for cultivating an increased or larger area than has heretofore been possible with this type of machine. This general object is carried out, essentially, by means of the combination with the ground wheels and general frame, of shovel beams attached to the frame forward of the wheels and constructed each of two members, one member of the beam extending rearwardly upon one side of the adjacent wheel, and the other member on the other side of said wheel, and each member carrying cultivating shovels. The result is that as the machine proceeds over the field, the shovels on the inner member of each beam cultivate upon opposite sides of one row of corn or other plant, while the shovels on the outer member of each beam cultivate, respectively, one side of two other rows. Thus an increased area of ground is cultivated with each passage of the machine across the field.

My invention further comprehends the swiveling of these beams to the frame in such wise that they shall have free lateral and free vertical movement, and in combining with the beams mechanism for sustaining or floating them while in operation, for lifting them out of operation, for permitting them to swing laterally, and for locking them when out of operative position.

A still further object of my invention is that of making the rear ends of the members which constitute the shovel beams adjustable so that the distance between the members may be varied and made greater or less so that the shovels may travel in different paths.

With these objects in view my invention is carried out by the instrumentalities hereinafter described and then more fully pointed out in the claims.

In the accompanying drawings, Figure 1 is a top plan view of my improved cultivator; and Fig. 2 is a side elevation of the same.

In these drawings, I have illustrated the preferred form of my device, in which the reference numeral 1 indicates the main frame which is provided at its forward end with a draft tongue 2 which is rigidly secured thereto. The frame is provided near its rear end with the axle frame 3, which is preferably journaled in bearings 4 near the rear of said frame and provided at its lower end with the horizontal axle portions 5 on which are journaled the ground wheels 6. Secured near the forward end of the frame 1 is a transverse bar or shaft 7 which is rigidly secured to the frame 1 in any suitable manner. This shaft is substantially equal in length to the distance between the ground wheels 6 and is provided at its outer ends with bearing portions, upon each of which is journaled a supporting bracket 8 provided with a horizontal bearing, and which, in turn, is vertically bifurcated to receive the collar 9, which is rigidly secured to the shaft 7 and serves to hold the bracket against longitudinal movement on the shaft and to allow the same to rotate thereon. The collar 9 is also rigidly connected to brace rods 10 and 11 which extend from the collar to suitable points on the frame, to which they are rigidly secured to hold the shaft against movement.

The forward portion of the supporting bracket 8 is provided with a vertical bearing 12, adapted to receive the vertical standard 13 which is provided at its lower end with a substantially horizontal portion 14. The bearing 12 of the bracket 8 is bifurcated in a horizontal direction to receive the collar 15 which is rigidly secured to the standard 13 by means of a set screw 16 and serves to retain the shaft against longitudinal movement in the bearing and to allow the same to rotate therein. Thus, it will be seen that the standard 13 is free to move about the horizontal axis of the shaft 7 and is also free to move about a vertical axis in the bearing 12.

It will be understood that a bracket 8 is provided at each end of the shaft 7 and that each standard 13, carried by the brackets 8, is adapted to support a beam 17, the beams being identical in construction. The beams 17 each consist of two substantially parallel members 18, which are united at their forward ends and rigidly secured to the horizontal portion 14 of the standard 13. The members 18 extend on opposite sides of the wheel 6, and from a point near the forward end thereof to a point near the center thereof diverge one from the other; thence extend parallel for a distance and thence converge towards the rear, preferably by steps, as shown at 19. The rear ends of the members 18 are adjustably connected by a rod 20, extending through the members and provided with nuts 21 for adjusting the same thereon. The members 18 are each provided near the center, preferably on the parallel portions thereof, with a bracket 22, adapted to receive the shank 23 of a shovel 24, which is adjustably mounted therein and adapted to be secured in its adjusted position by set screws 25. Each member 18 is also provided on one of the steps 19 of its rearwardly converging portion with a second bracket, 22, supporting a shank 23 and a shovel 24, as before. The rear ends of the members 18 are provided with transverse guideways 26, in which is mounted a bar 27, adapted to be adjusted transversely of the beam and to be secured in its adjusted position by set screws 28, mounted in the outer walls of the guideways 26. This bar is provided near its central portion with a supporting bracket 29, adapted to receive the shank 30 of the shovel, as before described.

It will be apparent that the construction above described is such as to distribute the weight of the beams, and the shovels carried thereby, on the opposite sides of a center line taken through the vertical pivotal center of the beams and extending longitudinally of the cultivator, and to permit the beams to have a free movement both vertically and laterally of the cultivator.

In order that the beam may be raised and lowered to move the shovels into and out of their operative position, the frame 1 is provided on each side with an upwardly extending arm or yoke 31, which is loosely pivoted thereto at 32 by means of an elongated slot 33 formed in the lower end thereof and engaging a pivot lug 32 on a bracket 34 which is mounted on the frame. This arm or yoke is provided near its upper end with a transverse bar or arm 35, upon which is loosely mounted the upper end of a hand rod 36, which is provided with an elongated opening 37 engaging the bar 35, thus connecting the hand-rod to the arm in such a manner as to permit the hand-rod to have a free movement both lengthwise and laterally of the cultivator. The lower end of the hand rod 36 is pivotally connected to the beam 17 in any suitable manner, but I prefer to connect the rod in the manner herein shown, which consists in providing the beam 17 with a longitudinally extending bar 38 which is secured to the narrow front and rear portions of the beam and extends substantially parallel with the straight portions of the inner side member thereof. A short shaft 39 is journaled on the frame formed by the side member 18 and the bar 38, preferably by mounting the ends of the shaft 39 in the bearing brackets 40, mounted on each of said members. The rod 36 is rigidly secured to the shaft 39, as shown. A chain 41 is secured at one end to the rod 36, preferably by passing one of the links thereof through the elongated opening 37 of said rod.

The opposite end of the chain is secured to the frame 1, a spring 42 being preferably interposed between the end of the chain 41 and the frame. This chain serves to limit the rearward movement of the yoke or arm 31 and the rod 36, and thereby limit the downward movement of the rod 36 and the beam 17 and support the same in its operative position. This construction forms a floating support for the beam, the weight of the beam and its shovels being carried by the supporting mechanism instead of resting upon the ground, the spring 42 giving sufficient resiliency to enable the beam to be adjusted to determine its position and the depth to which the shovels shall enter the ground. When the beam is raised and the arms 31 moved forward beyond the point of their pivotal support on the frame 1, the center of gravity is moved past said support and the tendency is for the beam 17 to draw the yoke 31 in a forward direction. This, however, is prevented by the rod 36 coming into contact with the rear portion of the frame 1, and, consequently, the arm 31 is locked against movement and the beam held in its elevated or inoperative position. This floating support, which comprises the hand-rod having a free movement both laterally and lengthwise of the cultivator, when combined with a beam, connected at its forward end to the frame by vertical and horizontal pivots and having its weight distributed on opposite sides of the center line taken through the vertical pivot, produces a structure in which the two movements of the beam are so combined with the two movements of the hand-rod that the beam is floated as well in any of its lateral positions as when trailing directly behind the coupling, and which permits the beam to be readily lifted when in any position.

While I have described but a single beam and the operating mechanism for but a single beam, it will be obvious that a similar beam incloses the other wheel and is provided with similar operating mechanism, whereby the beams may be adjusted and swung into and out of operative position independently one of the other.

From the foregoing description it will be seen that I have provided a machine which will cultivate the soil on both sides of the ground wheels, thereby cultivating a greatly increased area and cultivating both sides of the central row and one side of two adjacent rows, which is a simultaneous cultivation of two complete rows of plants; and further, that I have provided means for adjusting the two members of the beams to vary the distance between the shovels and accommodate the same to different distances between the rows of plants; and further, that I have provided means for raising and lowering the beams to move the shovels into and out of their operative position, and to lock the same when they are moved out of their operative position.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a cultivator, the main frame and its ground wheels, shovel beams each surrounding the adjacent wheel and having their forward ends coupled to the main frame on horizontal and vertical axes, to afford vertical and lateral movements to the beams, in combination with beam-floating and lifting devices, comprising a hand-rod for each beam pivoted thereto at its lower end, an arm for each hand-rod connected thereto by a joint allowing the hand-rod free lengthwise and lateral movement, each arm being pivoted to the main frame, and springs connecting these devices to the main frame and giving them a floating support, whereby the beams while surrounding the wheels are floated as well in any of their lateral positions as when trailing directly behind their couplings and whereby they are readily lifted when in any position.

2. In a machine of the character described, the combination, with a frame and a ground wheel therefor, of a beam pivotally supported from said frame in front of said wheel and comprising two members extending on opposite sides of said wheel, a bar extending substantially the full length of said beam adjacent to the inner side member thereof, a shaft extending between said bar and the adjacent side member of said beam, supporting means pivotally connected to said shaft, means for adjustably connecting the rear ends of the side members of said beam, and shovels carried by said beam.

In testimony whereof, I affix my signature in presence of two witnesses.

GEORGE A. PLANK.

Witnesses:
JOHN E. SHARTLE,
WALTER S. MOORE.